J. RAU.
MACHINE FOR MAKING HOLLOW GLASSWARE.
APPLICATION FILED OCT. 23, 1911.
1,149,857.
Patented Aug. 10, 1915.
6 SHEETS—SHEET 5.
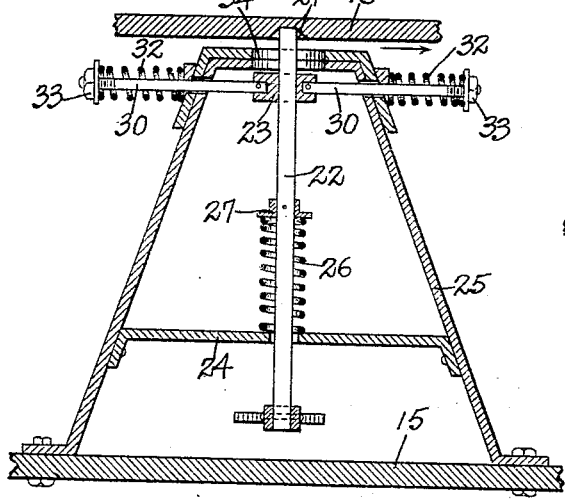
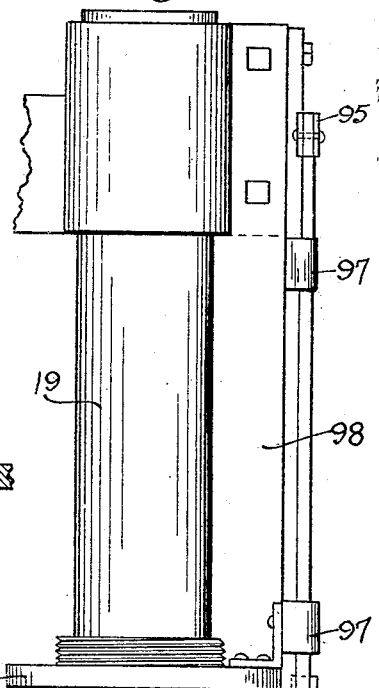
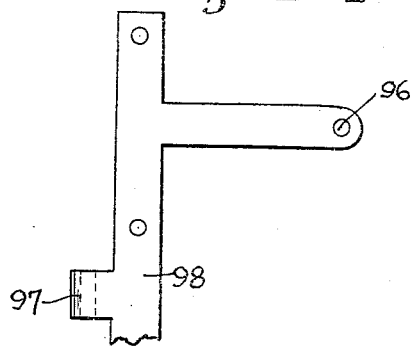
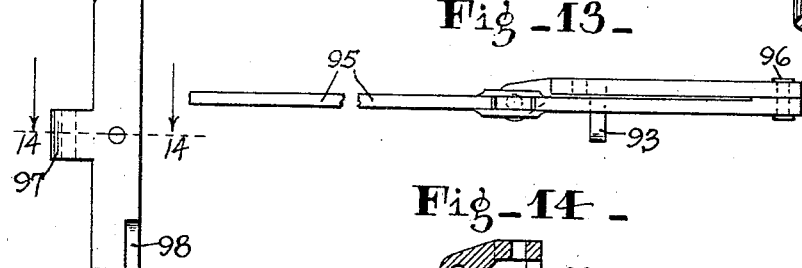
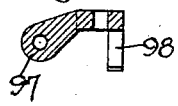
WITNESSES:
A H Edgerton
O. M. McLaughlin
INVENTOR.
John Rau
BY
V H Lockwood
ATTORNEY.

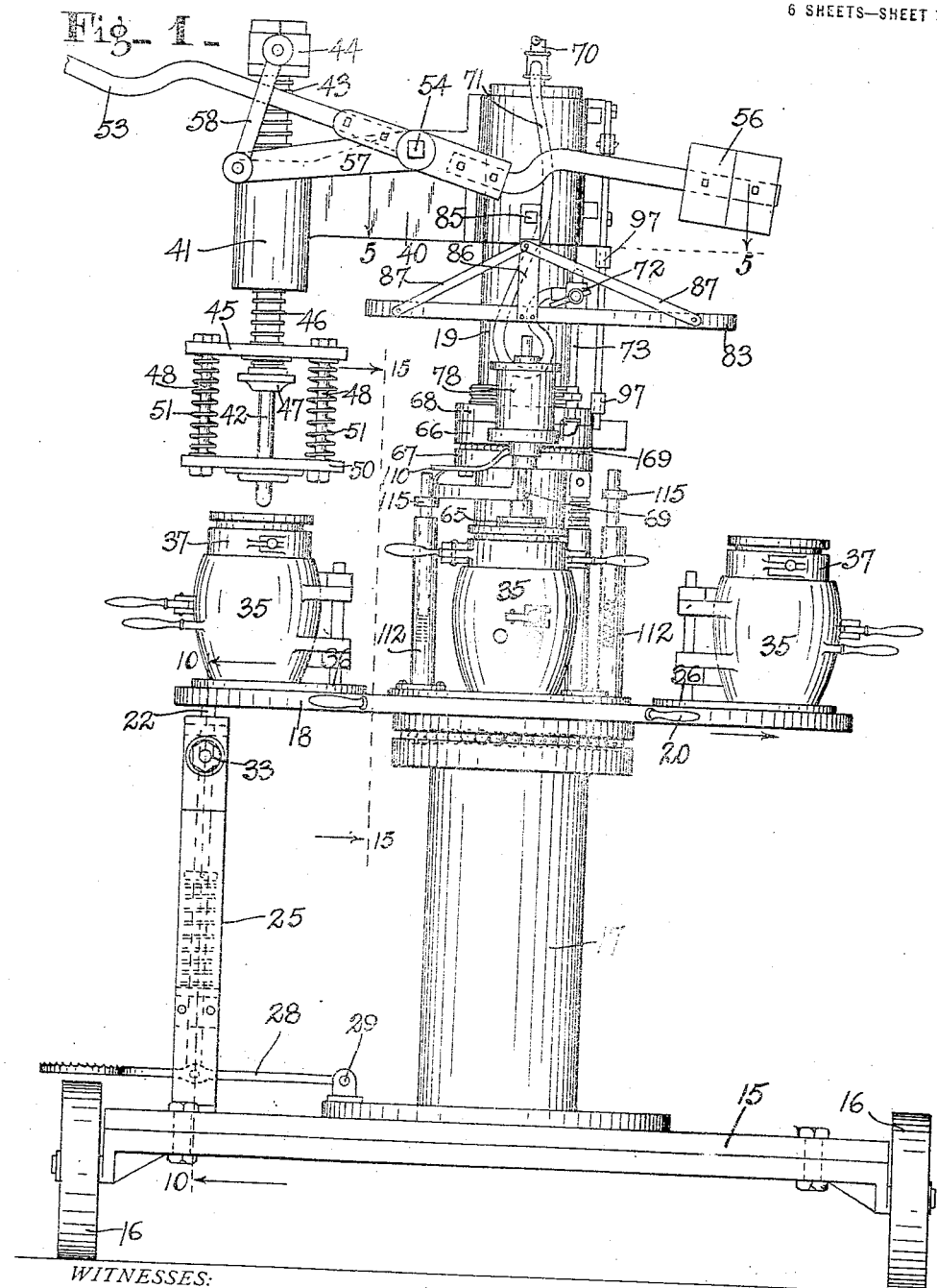

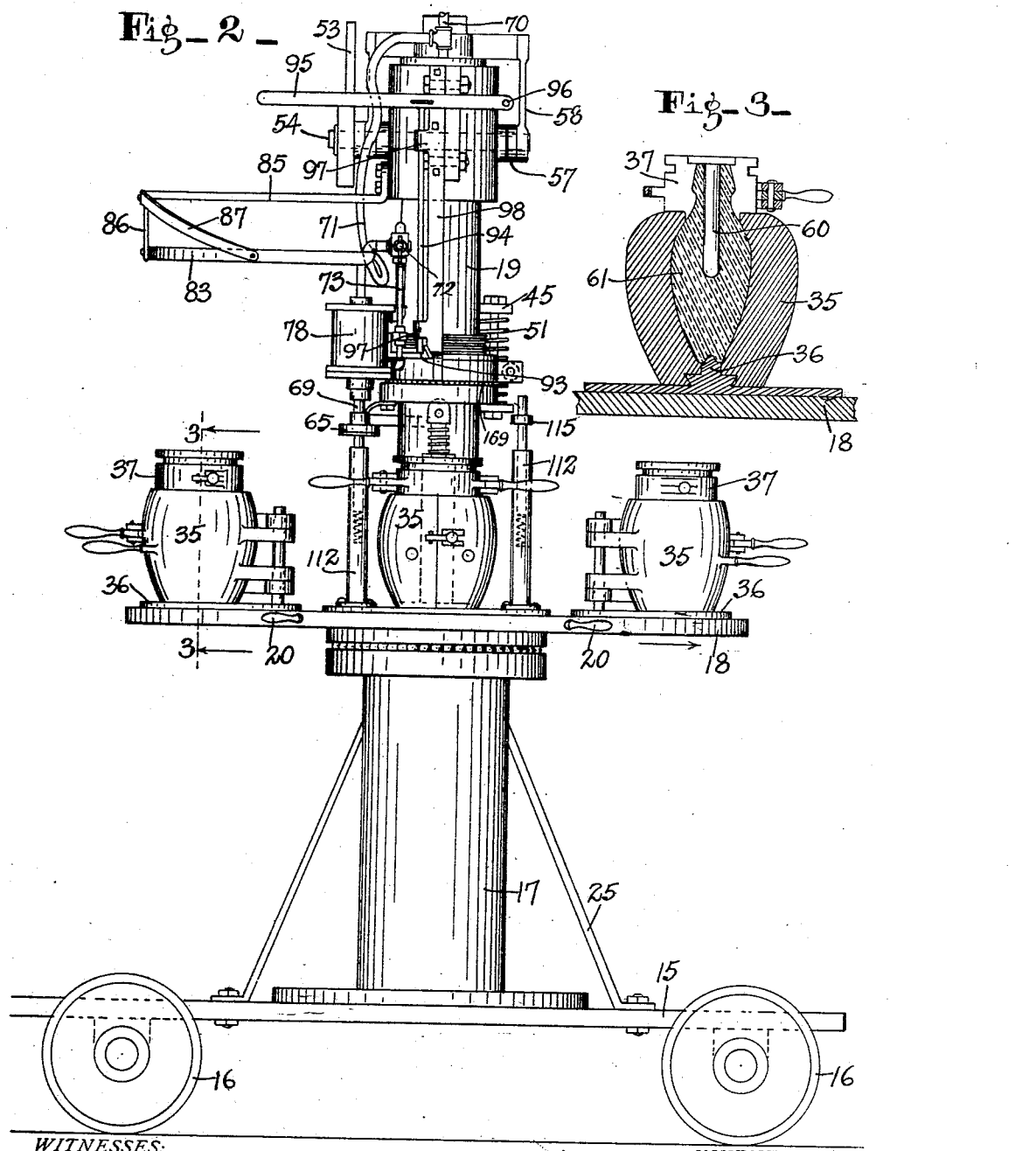

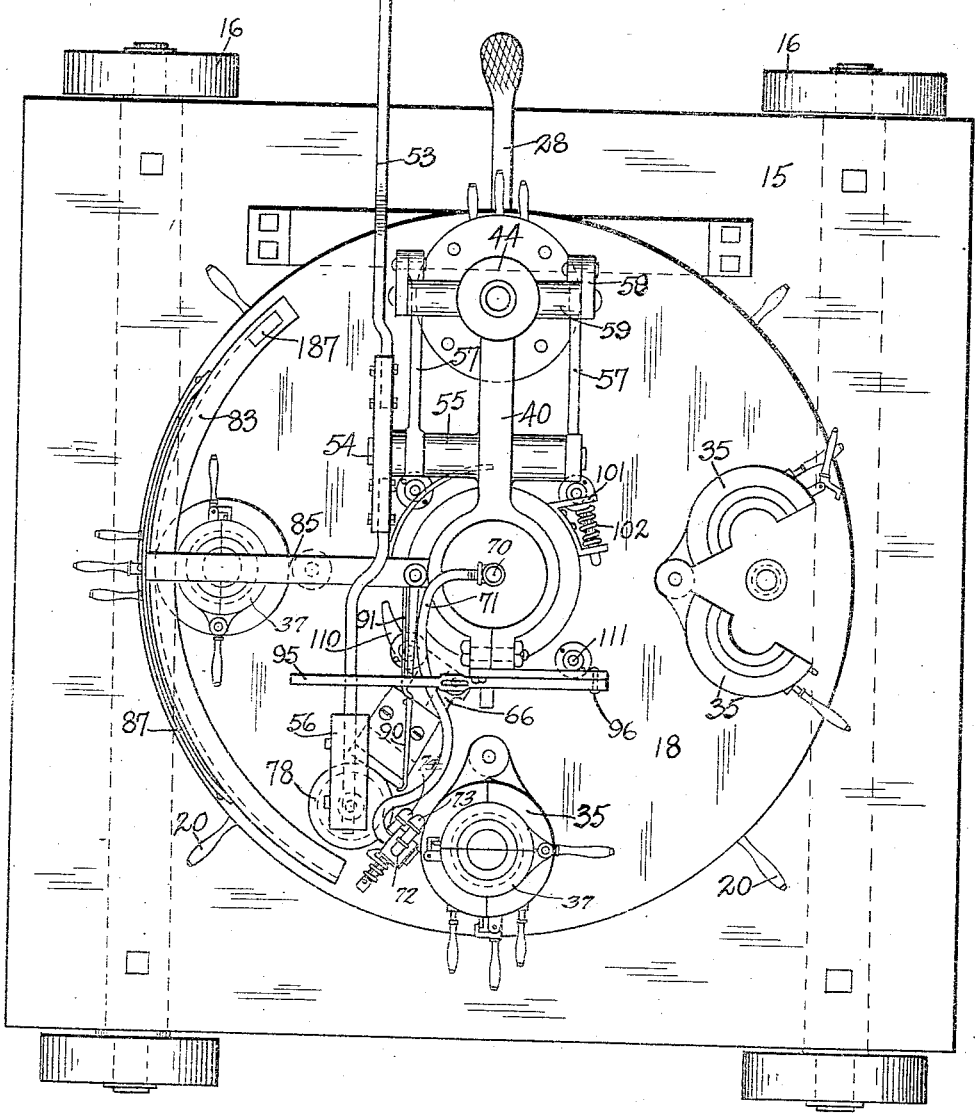

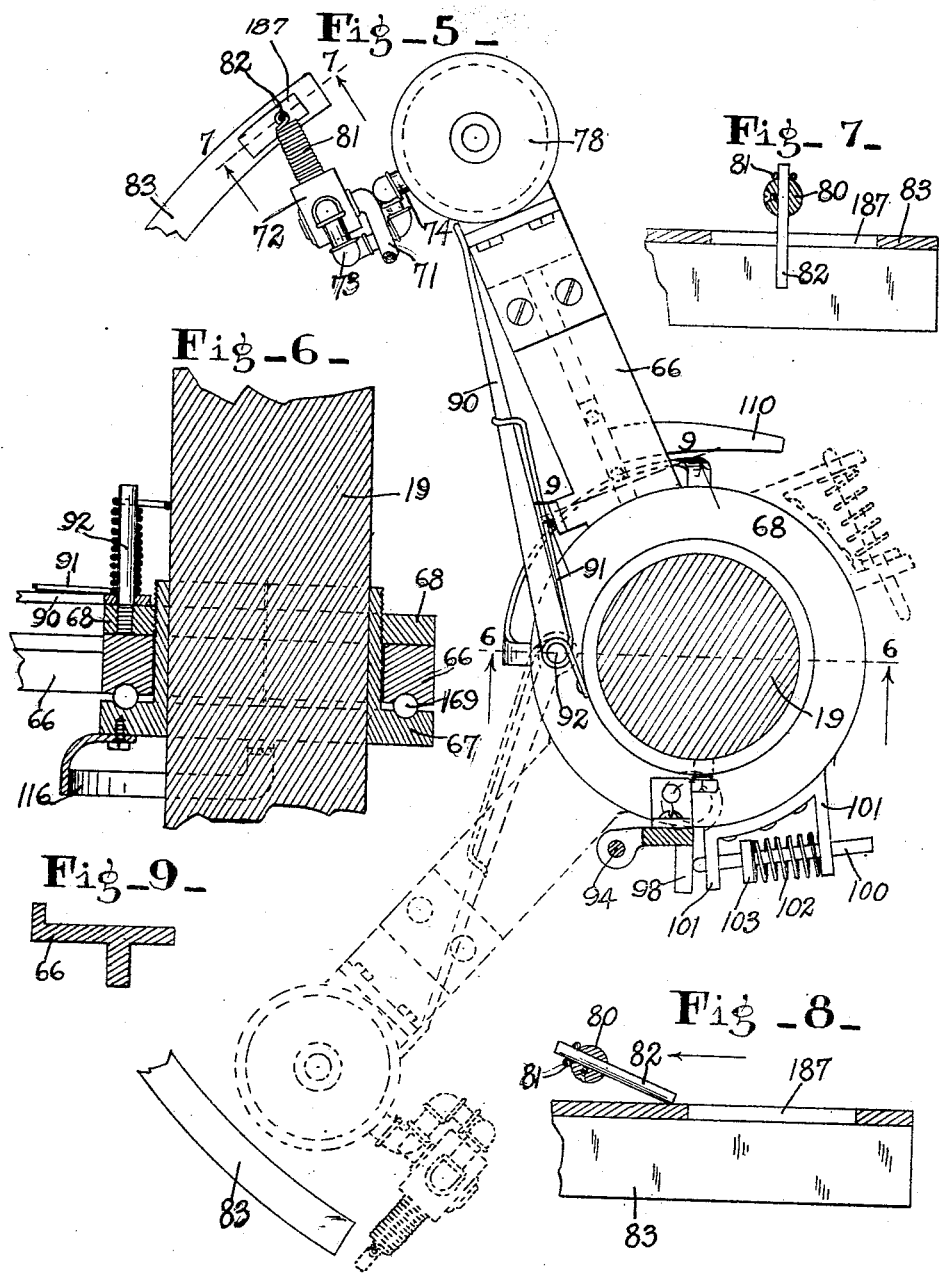

J. RAU.
MACHINE FOR MAKING HOLLOW GLASSWARE.
APPLICATION FILED OCT. 23, 1911.
1,149,857.
Patented Aug. 10, 1915.
6 SHEETS—SHEET 6.
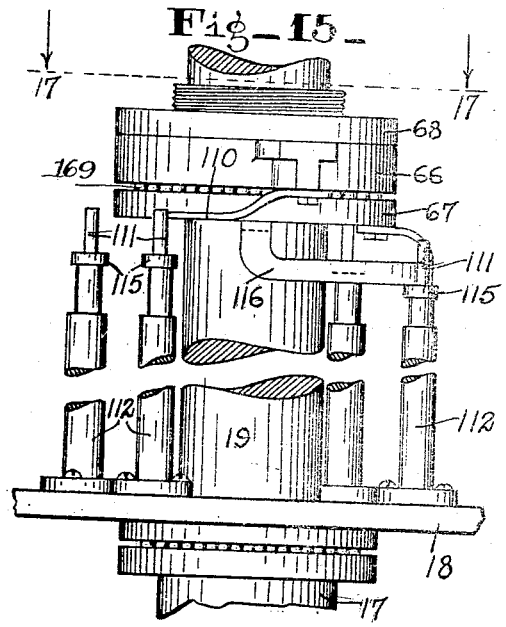
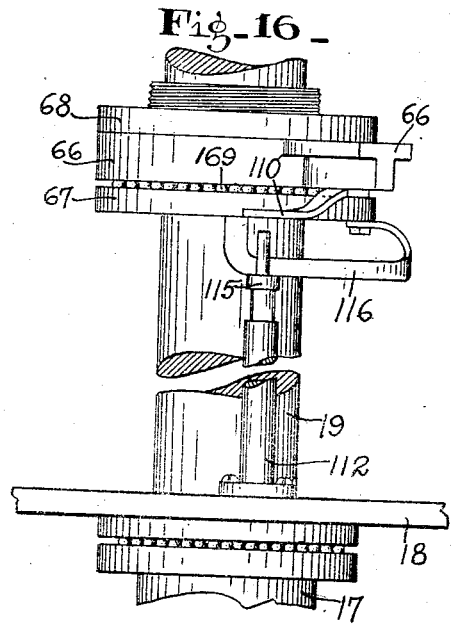
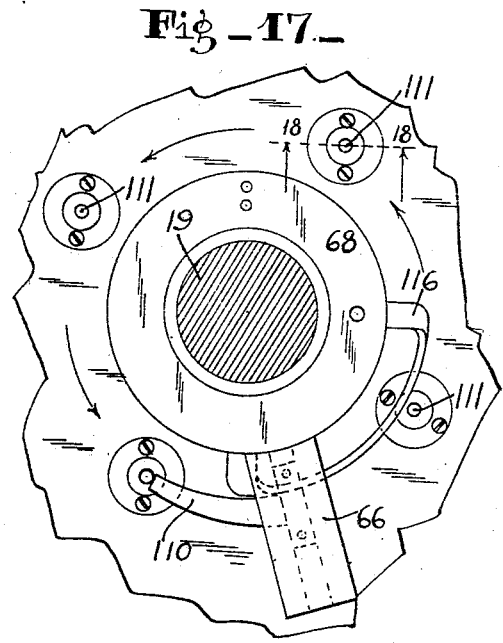
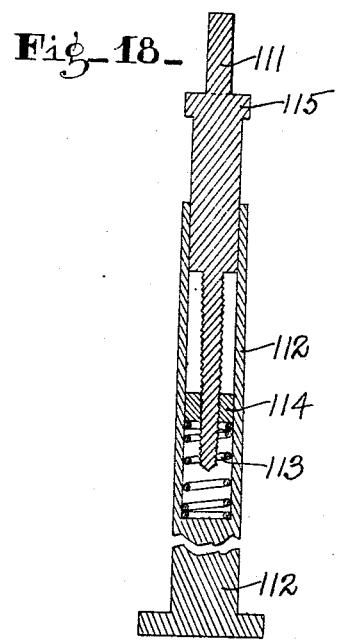
WITNESSES:
A H Edgerton
O. M. McLaughlin
INVENTOR.
John Rau
BY
V H Lockwood
ATTORNEY.

UNITED STATES PATENT OFFICE.

JOHN RAU, OF INDIANAPOLIS, INDIANA.

MACHINE FOR MAKING HOLLOW GLASSWARE.

1,149,857.   Specification of Letters Patent.   Patented Aug. 10, 1915.

Application filed October 23, 1911. Serial No. 656,288.

*To all whom it may concern:*

Be it known that I, JOHN RAU, a citizen of the United States, and a resident of Indianapolis, county of Marion, and State of Indiana, have invented a certain useful Machine for Making Hollow Glassware; and I do hereby declare that the following is a full, clear, and exact description thereof, reference being had to the accompanying drawings.

The object of this invention is to employ the construction of machines for forming glass blanks for hollow glassware. It has been designed with particular reference for use in the manufacture of very large glass bottles, jars, demijohns and carboys having capacities of from five to ten or fifteen gallons.

In the manufacture of such large hollow glassware I have discovered that it is necessary to have means for maintaining the opening in the upper end of the glass blank, which is produced by the plunger. With so large a body of molten glass, when the plunger is withdrawn, the glass collapses or runs together and destroys the opening which has been made by the plunger and which is necessary to enable the article to be blown.

Therefore, the chief feature of this invention consists of introducing air under pressure into the plunger opening as soon as the plunger is withdrawn. This air under pressure tends both to maintain the plunger opening and to chill the inner surface of the glass around said opening without enlarging the blank so that the form of the opening and the upper part of the glass blank will be maintained thereafter while the blank is being lifted over to the blowing machine and compressed air introduced therein for blowing of the article.

There are other novel features of this invention which will be understood from the accompanying drawings and the following description and claims.

In the drawings Figure 1 is a side elevation of the machine, parts being broken away. Fig. 2 is a rear elevation of the machine looking in the direction of the arrows 2—2 in Fig. 1. Fig. 3 is a vertical section on a line 3—3 of Fig. 2. Fig. 4 is a plan view of the machine, Fig. 5 is a horizontal section on the line 5—5 of Fig. 1, one position of the blow-head and supporting arm being shown by dotted lines. Fig. 6 is a vertical section on line 6—6 of Fig. 5 showing through a part of machine. Fig. 7 is a vertical section on line 7—7 of Fig. 5 showing the part in one position. Fig. 8 is the same showing said part in another position. Fig. 9 is a vertical section on a line 9—9 of Fig. 5. Fig. 10 is a vertical section on a line 10—10 of Fig. 1. Figs. 11, 12, and 13 show certain detail parts, the parts shown in the last two figures being centrally broken away. Fig. 14 is a section on the line 14—14 of Fig. 12. Fig. 15 is a side elevation on the line 15—15 of Fig. 1 of the central portion of the machine with parts omitted and being centrally broken away. Fig. 16 is the same as Fig. 15 with parts moved to different positions and some of the parts omitted. Fig. 17 is a horizontal section on line 17—17 of Fig. 15 and parts being broken away. Fig. 18 is a vertical section on line 18—18 of Fig. 17, the table being omitted.

The drawings herein show a platform 15 carried by wheels 16 and having a stationary tubular stand 17 secured thereon which carries a mold table 18 so that it is rotatable and a column 19 which extends up centrally above the table, the lower end of said column fitting in stand 17, although that is not shown. The table 18 is turned by hand, handles 20 being provided for that purpose. The directions of the movements of the table are indicated by the arrow in Fig. 1.

In making large hollow glass ware the volume of glass is so large and hot that a jar of the mold, or table on which the mold is mounted, is very liable to displace or misform the glass and interfere with the making of the blank so that it can not be blown, hence there is provided herein means for preventing such jarring of the mold on the table 18. This is shown in Fig. 10 where a notch 21 is made in the under side of the table and which is beveled on the side in the direction which the table moves. Into said notch a stop rod 22 enters, said stop rod being vertically reciprocable in the adjustable guide block 23 and a cross bar 24 of the A-shaped frame 25 secured to the platform 15, see Fig. 1. A spring 26 tends to hold the rod up into a position to engage the notch in the table and will return said rod after being depressed by the pedal lever 28 fulcrumed on the pin 29 to the base. The adjustable guide block 23 is secured by two rods 30 which extend in opposite directions and loosely through the frame 25, and on each rod there is a spring 32 lying between the frame 25 and the nut 33 on the outer end of the rod. This connection permits some lateral yielding of the stop rod 22 and said rod extends through a large opening 34 in the top of the frame 25 so that the upper end of the said frame will not interfere with the lateral movement of the rod 22.

As the table 18 is revoluble the rod 22 slips into the notch 21 and stops the table without a jar on account of the spring 32. Upon the table 18 press molds 35 are mounted being formed of two halves hinged together and provided with the usual handles and locks and at the bottom the halves are internally grooved to close about the center piece 36 on a table. There is an annular series of these molds and upon them lift-overs 37 are placed which may be formed in the usual way.

The plunger mechanism herein shown consists of an arm 40 secured to the stationary column 19 at its upper end and carrying the plunger-head 41 through which the plunger 42 extends. There is a spring 43 around the plunger above the head 41 and below the collar 44 secured on the upper end of the plunger. There is also a cross bar 45 through which the plunger extends about midway and a spring 46 lies about the plunger between said bar and the plunger-head 41. A collar 47 is secured to said plunger below said bar 45. Rods 48 extend loosely through the ends of bar 45 and on their lower ends carry a cross-bar 50 and springs 51 surround the rods 48 and lie between bars 45 and 50.

The plunger is actuated by the hand lever 53, which is secured between its ends on a shaft 54 mounted in the sleeve 55 extending laterally from the arm 40, see Fig. 4. The outer end of the lever 53 is counterbalanced by a weight 56. A pair of arms 57 are secured to the shaft 54 and lie, one on each side of the arm 40 and are connected by the connecting rods 58 with arms 59 extending laterally from the collar 44 on the upper end of the plunger. Hence when the lever 53 is pulled downward it will depress the plunger and form the opening 60 in the upper end of the glass blank 61, as shown in Fig. 3. The yielding stop 22 is located beneath the plunger, see Fig. 1, so that it stops the table in the right position to bring the mold and lift-over under the plunger.

After the blank has been pressed and the plunger elevated, the stop 22 is depressed and the table revolved slightly and the pneumatic apparatus is swung over to the left and the blowhead 65 immediately brought down upon the lift-over and press mold carrying the blank just pressed and air under pressure is introduced therein to maintain the opening 60 by its pressure and by chilling the glass somewhat.

The pneumatic apparatus is carried by laterally swinging arm 66, see Fig. 5, which moves from the full line position to the dotted line position there shown, and back again, completing the operation of the machine. This arm, as shown in Fig. 6, is mounted on the column 19 between collars 67 and 68, which are secured to said column and having bearing balls 169 and located between the collar 67 and said arm 66. On its outer end it carries an air cylinder 78 which may be of the usual type in glass blowing machines and which contains a piston, not shown, for actuating the piston rod 69 that carries the pneumatic head 65 which is connected through an air passage, not shown, from the cylinder of the pneumatic head to the glass blank.

Air is supplied to the cylinder from the stationary pipe 70 secured to the top of the column 19 and leading from a source of air under pressure and a flexible tube 71 leads from the pipe 70 to the valve box 72, see Fig. 5. Pipe 73 leads to the lower end of the cylinder and pipe 74 leads from the valve box to the upper end of the cylinder. The piston rod 69 is hollow and open within the cylinder on the upper side of the piston in said cylinder and air entering through the upper pipe 74 depresses the pneumatic head and enters the corresponding blank while air entering the pipe 73 elevates the pneumatic head. This construction is well known in glass blowing machines.

The valve in the valve box 72 has an outwardly extending valve stem 80 with a spring 81 about it for holding it normally in position to shut off the passage of compressed air through the valve box. The valve stem is actuated by the engagement of the arm 82 on the valve stem with a horizontal plate 83 while the valve stem 80 and arm 82 are being moved to the right, as shown in Figs. 1 and 8.

The plate 83 or track is a long bar, see Figs. 4 and 5, concentric with column 19 and extends throughout the extent of the lateral movement of the arm 66 carrying the pneumatic head 65. Said track 83 is supported, as shown in Fig. 2, by a fastened arm 85 which at its inner end is secured to the collar portion of the arm 40 where it surrounds the column 19 so that in effect the arm 85 is secured to column 19. A vertical bar 86 connects the outer end of arm 85 with a metal portion of track 83 and two inclined bars 87 extend from the upper end of bar 86 and are secured to the track 83 near its ends. Track 83, as shown in Figs. 7 and 8, is made of angle iron and a horizontal surface thereof has at its left hand end a slot 187.

The arm 66 carrying the blowhead is swung from the dotted line position shown in Fig. 5 to the full line position by the arm 90 actuated by the spring 91, said arm being fulcrumed on pin 92 upon the collar 68, as shown in Figs. 5 and 6, and in such movement the arm 82 of the valve stem becomes vertical again, as shown in Fig. 7. Then the table 18 is moved by hand to the right so as to carry the press mold in which the blank has just been pressed from the pressing position, shown in Fig. 1, to a position under the blowhead carried by arm 66 when in the full line position shown in Fig. 5. The operator then moves the table by hand to the right and as the valve actuating bar 82 rides upon the plate 83, as shown in Figs. 1 and 8 the air is turned on. This continues until the arm 66 has been moved to the dotted line position shown in Fig. 5. Then the valve actuating arm 82 rides off the plate 83 and shuts off the air. At the same time the catch 93 secured to the blowhead and having a beveled head moves under and past the beveled lower end of the vertical catch rod 94 and whereby said arm is held from the return movement under the influence of the spring 91. In other words, said rod 94 holds the blowing apparatus in the dotted line position shown in Fig. 5 until it is desired to return it to the full line position as has heretofore been explained, and then the catch rod 94 is released by pushing up on the lever 95 fulcrumed at 96 to a stationary part of the machine and pivoted between its ends to the upper end of rod 94. Rod 94 is mounted on two projections 97 from the bar 98 which at its upper end is secured to a stationary part of the machine, see Fig. 2.

When the pneumatic apparatus is moved from the dotted line to the full line position shown in Fig. 5 by releasing the rod 94 the arm 66 is stopped at the full line position by pin 100 engaging the lower end of a stationary bar 98, see Fig. 5, as the pin 100 revolves around the column 19 with said arm 66. This results from the pin 100 being mounted in a two arm bracket 101 which is secured to the inner circular portion of the arm 66, see Fig. 6, at a point almost opposite the extended portion of the arm 66. The pin 100 is yieldingly mounted by a spring 102 surrounding the pin between one arm of the bracket and the collar 103 on the pin.

As the table is thus moved it moves the arm 66 with it from the full line position to the dotted line position shown in Fig. 5 by the following means: A bar 110 is secured to the annular portion of said arm, see Fig. 15, in position to be engaged by the upper end of a rod 111 which is vertically supported in a tube 112 extending up from the table 18. Within the tube 112 there is a spiral spring 113, see Fig. 18, under a collar 114 on a threaded lower end of rod 111 for yieldingly supporting said rod, and near its upper end it has a collar 115. As the table is revolved it is evident from an inspection of Fig. 15 that the rod 111 by engaging the arm 110 will swing the arm 66 from the full line position shown in Fig. 5 to the dotted line position, but when the arm 66 reaches the dotted line position it will be stopped as heretofore explained and the rod 111 will be moved down out of engagement with arm 110 by a cam bar 116 which is stationary and secured to the collar 67 on the column 19. The cam bar 116 is engaged by the collar 115 on the rod 111. There are four rods 111 located equidistant from each other on the table 18, see Figs. 15 and 17, one for each press mold and located with particular reference to the position of the press molds so they will properly perform the function above explained.

After the arm 66 and blowing means have been moved to the position as shown by dotted lines in Fig. 5, the glass surrounding the hole in the blank will have become hardened enough to retain its form and maintain the size of the opening in the blank. Then the pneumatic head is lifted, the mold opened and the lift-over carrying the blank removed to a glass blowing machine (not shown) where the blank is placed in a blow mold and the glass article is blown.

I claim as my invention:

1. A machine for forming blanks for making hollow glassware including a press mold closed at one end and open at the other end, a lift-over on the press mold, a plunger insertible in the lift-over and open end of said mold for pressing the glass blank therein and forming a blow opening in the blank, means for actuating said plunger, a blow head, and means for applying the blow head upon the lift-over while on said press mold after the withdrawal of the plunger for introducing air under pressure therein.

2. A machine for forming blanks for making hollow glassware including a revoluble table, a press mold mounted on said table in a fixed position with the mouth of the mold always uppermost, a plunger mounted in fixed position above the table and adapted to enter the mouth of the mold when in position under the plunger, a blow head mounted vertically movable above the table and to one side of the plunger and over the path of said press mold, means for bringing said blow head down upon said press mold when it is moved from the plunger position, and means for introducing air under pressure into said blow head for chilling the glass around the blow opening formed in the blank by the plunger.

3. A machine for forming blanks for making hollow glass ware including a press mold, a plunger above the press mold for pressing the glass therein and forming the blow opening in the blank, a rotatable table for carrying and moving the press mold, an oscillatory arm above said table, pneumatic means carried by the outer end of said arm adapted to be moved down upon the press mold after the plunger has been removed and the table actuated to move the press mold from beneath the plunger for introducing air into the opening of the glass blank, said arm and pneumatic means being adapted to travel with the table and press mold.

4. A machine for forming blanks for making hollow glass ware including a rotatable table, a press mold thereon, plunger mechanism for the press mold, an arm pivotally mounted above the table, pneumatic mechanism carried by said arm and movable into position on the press mold after the plunger has been removed, valve mechanism for controlling the air in said pneumatic means, and a track above said table and arm and concentric with the table for engaging said valve mechanism and holding the valve open while the table, press mold and pneumatic means are moved in a direction away from the plunger mechanism.

5. A machine for forming blanks for making hollow glass ware including a column, a rotatable table concentric therewith, a series of press molds on said table concentric with the center thereof, plunger mechanism carried by said column in position to enter a press mold, a horizontally oscillatable arm on said column and extending over the path of the press molds, and pneumatic mechanism carried by said arm so that it can be moved into position on a press mold after the plunger is removed whereby air can be introduced into the glass blank while the press mold containing it is being moved away from the plunger mechanism.

6. A machine for forming blanks for making hollow glass ware including a rotatable table, a central upwardly extending column, press molds on said table arranged concentrically with said column, lift-overs for said molds, a plunger mechanism for said press mold, and horizontally oscillatory arm on said column above the table, an air cylinder on the outer end of said arm over the path of the press molds, pneumatic means controlled by said cylinder and adapted to be placed on a press mold after the plunger is removed, a valve box and means connecting it with the cylinder and movable therewith, means for supplying air to the valve box, a valve stem extending from said box, a spring on said valve stem for holding the valve in a closed position, an arm extending downward from said valve stem, a track curved concentric with said column and in position to be engaged by the arm from said valve stem and arranged so that while a press mold is being moved from the plunger position the valve will be open and air introduced into the blank in the press mold until the arm on the valve stem rides off said track.

7. A machine for forming blanks for making hollow glass ware including a column, a rotatable table concentric therewith, press molds on said table concentric with the center thereof, a plunger mechanism for said press molds, a horizontally oscillatory arm on said column above the table, an air cylinder on the outer end of said arm over the path of the molds, pneumatic means controlled by said cylinder and movable upon a press mold after the plunger is removed, valve mechanism for controlling the air supply to said cylinder, a track in connection with said column and concentric therewith and in position to actuate said valve mechanism as it is oscillated, and means mounted on the table for moving said arm carrying the pneumatic means with the table as the latter is moved while air is being introduced into a blank within one of said press molds carried by said table.

8. A machine for forming blanks for making hollow glass ware including a column, a rotatable table concentric therewith, press molds on said table concentric with the center thereof, a plunger mechanism for said press mold, an arm mounted on said column above the table so it will be horizontally oscillatory, an air cylinder on the outer end of said arm over the path of the press molds, pneumatic means controlled by said cylinder and movable upon a press mold after the plunger is removed, valve mechanism for controlling the air supply to said cylinder, a track in connection with said column and concentric therewith and in position to actuate said valve mechanism as it is oscillated, a projection from said arm carrying the pneumatic means, a vertically yielding rod carried by the table for engaging said projection and moving said arm as the table is moved and while air is being introduced into the glass blank in a press mold, and stationary means for engaging said rod as the table is revolved and disengaging the rod from the projection on said arm at the end of the operation of said pneumatic means.

9. A machine for forming blanks for making hollow glass ware including a column, a rotatable table concentric therewith, press molds on said table concentric with the center thereof, a plunger mechanism for said press molds, a horizontally oscillatory arm on said column above the table, an air cylinder on the outer end of said arm over the path of the molds, pneumatic means controlled by said cylinder and adapted to be moved down upon a press mold after the plunger is removed, valve mechanism for controlling the air supply to said cylinder, a track in connection with said column and concentric therewith and in position to actuate said valve mechanism as it is oscillated, a projection from said arm carrying the pneumatic means, a plurality of rods one for each press mold adapted to engage the projection from the arm carrying the pneumatic means and turn said arm along with the table while air is being introduced into the blank in the press mold, a collar on each rod, a tubular stand secured on said table in which the lower part of the rod is mounted, a spring in said tubular stand for yieldingly supporting the rod, and a stationary cam-bar in position to engage the collar on each rod and depress the rod when the arm carrying the blowing mechanism has reached the limit of the blank chilling movement.

In witness whereof, I have hereunto affixed my signature in the presence of the witnesses herein named.

JOHN RAU.

Witnesses:
E. H. MAYO,
J. H. WELLS.